March 11, 1930.  D. E. KEENEY  1,750,601
INSTRUMENT PANEL
Filed Sept. 26, 1927

Inventor
Don E. Keeney

By Blackmore, Spencer & Fink
Attorneys

Patented Mar. 11, 1930

1,750,601

UNITED STATES PATENT OFFICE

DON E. KEENEY, OF FLINT, MICHIGAN, ASSIGNOR TO A C SPARK PLUG COMPANY, OF FLINT, MICHIGAN, A COMPANY OF MICHIGAN

INSTRUMENT PANEL

Application filed September 26, 1927. Serial No. 222,116.

This invention relates to an improved means for mounting gauges on instrument panels and more particularly to panels of the type ordinarily provided on the dashboard of an automotive vehicle.

It is an object of this invention to mount an instrument in a support, such as an instrument panel or dashboard, in such a way that the instrument may readily be observed through an opening opposite which it may be secured and may also be readily removed for repair or replacement, a single opening serving, in preferred embodiments of this invention, both for the purpose of facilitating attachment of the instrument, by means of a bezel, and to permit inspection thereof. It is a further object of this invention to removably mount the instrument in such a way that it may be illuminated either from an external or an internal source of light.

Other objects of the invention will appear in the course of the following description, taken in connection with the accompanying drawing and appended claims.

Figure 1:
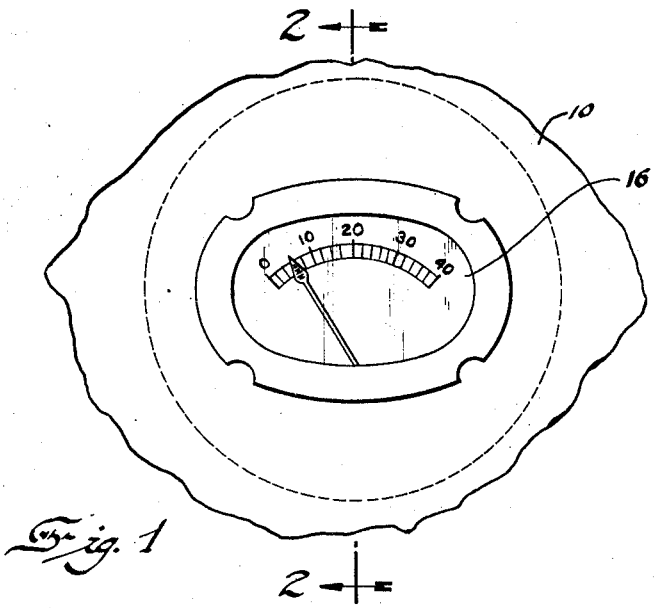
Figure 1 is a front view.
Figure 2:
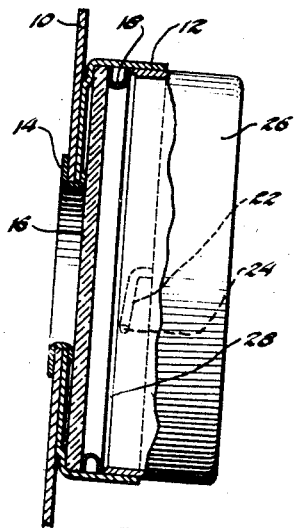
Figure 2 is mainly a section on the line 2—2 of Figure 1.
Figure 3:
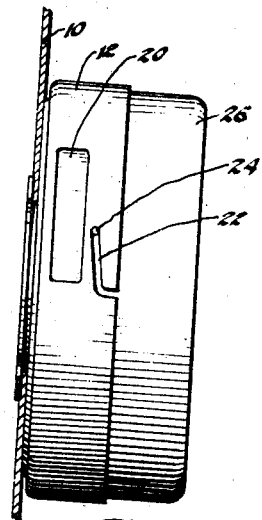
Figure 3 is a side view.

Referring to the drawing, the numeral 10 indicates the supporting strip or sheet, which may be either an instrument panel or the dashboard of the car. This strip is provided with an aperture adapted to serve as an observation opening and corresponding with the aperture in the locating cover 12. Said cover is shown as fitting against the instrument board 10 and held thereto by means such as a bezel 14, which may extend through and be flattened about the openings as indicated. The cover 12 is provided with a rearwardly extending circular flange within which the instrument is adapted to fit. The bezel 14, shown as provided with a decorative outline externally of the mentioned opening, may be of any desired ornamental design or finish, as indicated in Figure 1. Fitting within the cover 12 is a glass plate 16 held in place by an arcuate spring strip 18. The ends of the strip 18 correspond roughly with the ends of the circumferential slot 20 in the flange of the cover 12, this slot being covered by a strip of transparent material such as pyraline or glass. The spring strip is slightly compressed and is held within the flange by its own tension.

Diametrically opposite L-shaped bayonet slots 22 are provided in the normally concealed cover flange for co-operation with the pins 24 on the sides of the cup-shaped instrument case 26 in providing a separable connection which incidentally serves for a compressive effect, between cover 12 and said case. The case 26 is provided with a cover 28 which is usually a part of the instrument mechanism (not shown). The case is so inserted within the circular flange (both of these elements being shown as exceeding in diameter the mentioned observation opening) that the mentioned pins enter the slots, and is then rotated till the pins approach the rear ends of the slots. The spring strip is thus compressed by the rim of the instrument case and holds the pins firmly in the slots. It is obvious, of course, that the slot could be in the case and the pin in the circular flange instead of the reverse of this as illustrated.

I thus provide a simple arrangement for firmly and removably fixing an instrument to the rear side of an instrument panel or of a dashboard. The slot 20 and the corresponding "break" in the spring strips 18, said break being disposed opposite said slot, permit the entrance of light so that the instrument may be used with either internal or external lighting. When used with internal lighting the slot 20 is located on the side of the instrument toward the source of light.

I claim:

1. In an instrument mounting, a supporting strip provided with an aperture serving as an observation opening, a locating cover secured by means extending through said aperture and provided with a cylindrical flange which has a slot for permitting entrance of light, and an instrument case connected with said flange and provided with light-admitting means opposite said slot.

2. In an instrument mounting, a supporting strip provided with an aperture serving as an observation opening, a locating cover secured by means extending through said aperture and provided with a flange which has a slot for permitting entrance of light, a compression strip within said flange having a break corresponding with said slot, an instrument case, and a pin and slot connection between said instrument case and locating cover.

3. In an instrument mounting, a supporting strip provided with an aperture serving as an observation opening, a locating cover apertured to correspond with the strip and fixed over said aperture and provided with a cylindrical flange slotted for entrance of the light, and an instrument case corresponding in diameter to said flange fixed to said flange and provided with light-admitting means opposite said slot.

4. In an instrument mounting, a supporting strip provided with an aperture serving as an observation opening, a locating cover apertured to correspond to the strip and provided with a flange exceeding said opening in interior diameter, an ornamental bezel distinct from said cover and fixed within said aperture but visible externally thereof, and holding said cover and strip together, an instrument case interfitting with said flange, and a separable normally concealed connection between said instrument case and locating cover.

In testimony whereof I affix my signature.

DON E. KEENEY.